US006866348B2

(12) United States Patent
Ewel

(10) Patent No.: US 6,866,348 B2
(45) Date of Patent: Mar. 15, 2005

(54) ELECTRONICALLY CONTROLLED FULL POWER BRAKE VALVE

(75) Inventor: David E. Ewel, Mankato, MN (US)

(73) Assignee: Mico, Inc., North Mankato, MN (US)

( * ) Notice: Subject to any disclaimer, the term of this patent is extended or adjusted under 35 U.S.C. 154(b) by 0 days.

(21) Appl. No.: 09/827,335

(22) Filed: Apr. 5, 2001

(65) Prior Publication Data

US 2002/0145332 A1 Oct. 10, 2002

(51) Int. Cl.$^7$ ................................................. B60T 8/34
(52) U.S. Cl. .............................. 303/113.1; 303/117.1; 303/155
(58) Field of Search .......................... 303/155, 113.4, 303/113.1, 114.1, 114.2, 117.1, 7, 15; 188/358, 368, 369; 60/538, 545, 547.1

(56) References Cited

U.S. PATENT DOCUMENTS

| | | | |
|---|---|---|---|
| 3,731,979 A | | 5/1973 | Mikaila |
| 3,768,874 A | | 10/1973 | Riordan |
| 3,827,763 A | | 8/1974 | Kobashi et al. |
| 3,874,742 A | * | 4/1975 | Takayama ................ 303/114.1 |
| 3,877,756 A | * | 4/1975 | Inada et al. .............. 303/114.1 |
| 3,886,746 A | * | 6/1975 | Farr ........................... 60/534 |
| 4,305,624 A | * | 12/1981 | Belart et al. ............. 303/114.1 |
| 4,730,877 A | * | 3/1988 | Seibert et al. .............. 188/358 |
| 4,755,008 A | * | 7/1988 | Imoto et al. ............. 303/113.2 |
| 4,761,042 A | | 8/1988 | Seibert et al. |
| 4,768,842 A | * | 9/1988 | Ogino et al. ............. 303/114.1 |
| 4,876,853 A | * | 10/1989 | Shirai et al. ............... 60/547.1 |
| 4,914,917 A | * | 4/1990 | Schonlau .................. 303/113.4 |
| 5,013,094 A | * | 5/1991 | Nishii et al. ................ 188/358 |
| 5,031,968 A | * | 7/1991 | Takata ........................ 188/345 |
| 5,056,573 A | * | 10/1991 | O'Brien et al. ........ 152/209.12 |
| 5,169,215 A | | 12/1992 | Takata |
| 5,172,964 A | | 12/1992 | Levrai et al. |
| 5,221,126 A | * | 6/1993 | Inoue ......................... 188/358 |
| 5,246,281 A | * | 9/1993 | Leppek ..................... 303/114.1 |
| 5,328,257 A | * | 7/1994 | Tsukamoto .............. 303/115.2 |

(List continued on next page.)

OTHER PUBLICATIONS

MICO In–House *Hydraulic Brake Systems and Components for Off–Highway Vehicles and Equipment*, David E. Keyser & Keith Hogan, National Fluid Power Association Technical Paper 192–1,4; Form No. 80–950–073 07/92.

MICO In–House *Reverse Modulating Brake Valves, Circuit Design Considerations and Applications*, R.P. Middendorf & D.E. Keyser, SAE Technical Paper 920908; Form No. 80–950–074 Revised 10/92.

MICO In–House *Full Power Hydraulic Brake Actuation, Circuit Design Considerations for Off–Highway Vehicles and Equipment*, D.E. Keyser, Form No. 80–950 8/93.

*Primary Examiner*—Pam Rodriguez
(74) *Attorney, Agent, or Firm*—Merchant & Gould P.C.

(57) ABSTRACT

A hydraulic braking system having an electronically controlled full power brake valve is disclosed. The hydraulic braking system supplies a braking output for a vehicle having at least one brake. The hydraulic braking system includes a primary valve assembly that is configured to receive a manually controlled input that varies the braking output of the braking system. The primary valve assembly includes a first spool valve configured to vary the braking output according to the manually controlled input. The hydraulic braking system also includes a secondary valve assembly integral with the primary valve assembly. The secondary valve assembly is configured to receive input signals from a programmable electronic controller and includes a second spool valve configured to operate with the primary valve assembly. The secondary valve assembly also includes an actuator for engaging and actuating the second spool valve according to the input signals received from the programmable electronic controller such that the second spool valve modulates the braking output produced by the primary valve assembly.

37 Claims, 10 Drawing Sheets

U.S. PATENT DOCUMENTS

| | | | |
|---|---|---|---|
| 5,358,320 A | * 10/1994 | Fuchida | 303/116.1 |
| 5,462,343 A | 10/1995 | Yoshida et al. | |
| 5,531,509 A | * 7/1996 | Kellner et al. | 188/358 |
| 5,571,248 A | 11/1996 | Seetharaman et al. | |
| 5,613,740 A | * 3/1997 | Kawamoto et al. | 303/11 |
| 5,667,285 A | 9/1997 | Seetharaman et al. | |
| 5,890,363 A | * 4/1999 | Kobayashi et al. | 60/552 |
| 5,890,776 A | 4/1999 | Sawada | |
| 5,897,175 A | * 4/1999 | Terazawa et al. | 303/113.4 |
| 5,927,821 A | 7/1999 | Bauer et al. | |
| 6,007,160 A | * 12/1999 | Lubbers et al. | 303/114.1 |
| 6,155,654 A | * 12/2000 | Oyama | 137/14 |
| 6,183,049 B1 | * 2/2001 | Oka et al. | 303/114.1 |
| 6,276,136 B1 | * 8/2001 | Oishi et al. | 303/114.1 |

* cited by examiner

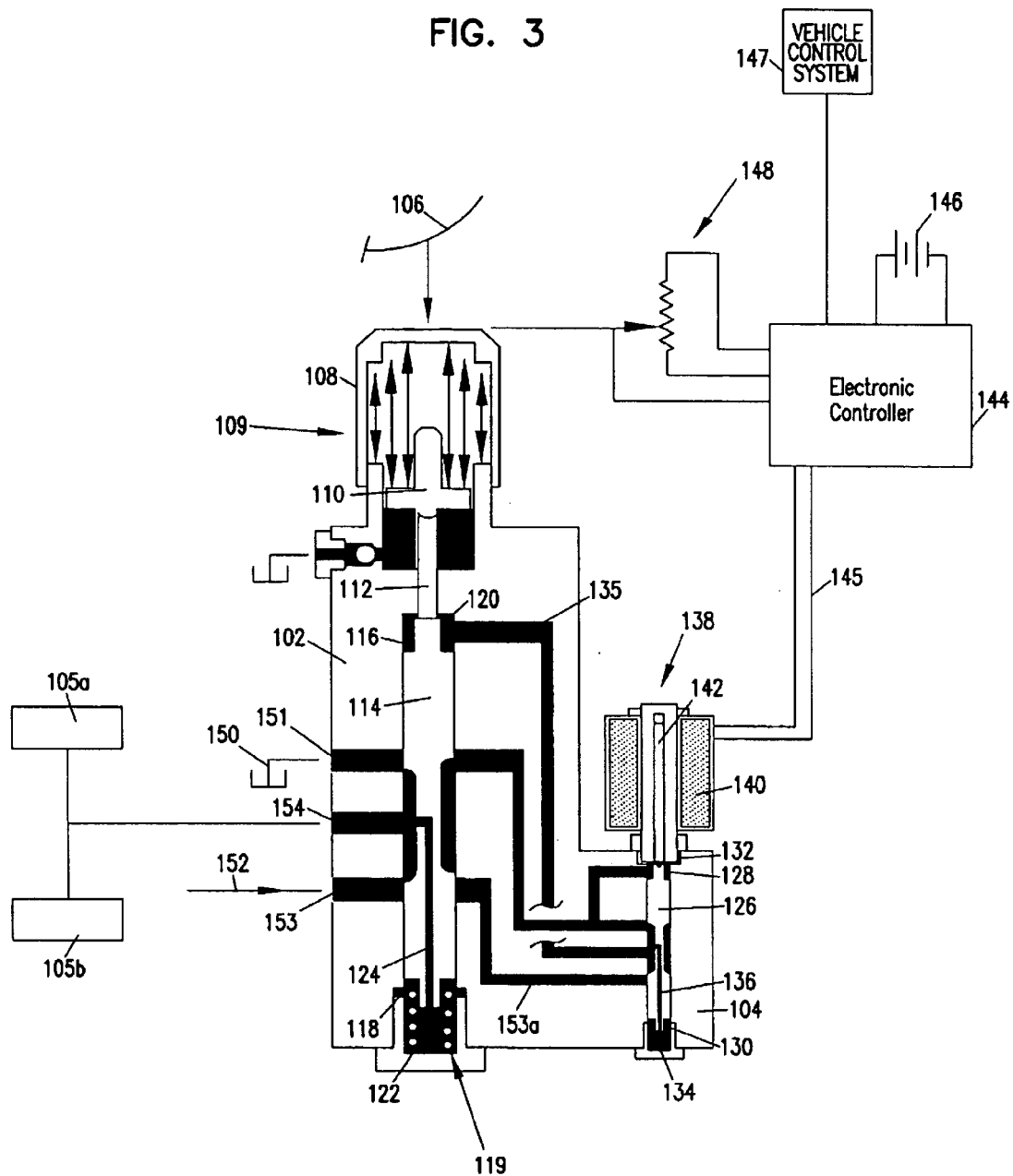

ELECTRONICALLY CONTROLLED FULL POWER BRAKE VALVE

TECHNICAL FIELD

The present invention relates to hydraulic braking systems, and more particularly, to an electronically enhanced hydraulic braking system.

BACKGROUND

Hydraulic braking systems for automobiles and/or other mobile vehicles are well known. Traditionally, hydraulic braking systems include a method of brake actuation to engage the vehicle brakes. For example, traditional braking systems use a variety of devices to convert mechanical power into fluid power, in the form of fluid displacement and pressure, to actuate the vehicle brakes. In these braking systems, however, the amount of fluid displacement and pressure supplied to the vehicle brakes is limited. Full power hydraulic brake systems, on the other hand, are capable of supplying larger amounts of fluid displacement and hydraulic pressure directly to the vehicle brakes. As a result, full power hydraulic braking systems are capable of supplying significantly higher braking torques with actuation that is faster than traditional hydraulic braking systems.

FIG. 1 illustrates a simple low-gain pressure output for a conventional hydraulic braking system. The vertical axis represents the percentage of pressure or braking output and the horizontal axis represents the percentage of mechanical actuation (e.g., pedal rotation). As shown in FIG. 1, a significant amount of pedal rotation is required to increase the braking output to high levels. For example, only 25 percent of available braking output or pressure is achieved through 75 percent of mechanical actuation. Conversely, the braking output or pressure is significantly increased as the mechanical actuation increases from 75 percent through 100 percent.

Variable ratios of braking output or pressure have been achieved when electrically controlled devices are utilized in conjunction with traditional hydraulic braking systems. For example, braking systems exist that utilize the electronically controlled device to vary the braking output based upon input received from vehicle control systems, such as, the anti-lock braking system, vehicle wheel sensors, or vehicle speed sensors. However, these systems have several shortcomings.

For example, many existing brake systems that use electronically controlled devices to vary the braking output only are capable of providing a preset output in response to certain vehicle conditions. Furthermore, many existing hydraulic braking systems that utilize electronically controlled devices to vary the braking output rely on a separate boosting mechanism to increase the pressure directly to the brakes. Hence these braking systems are limited in their ability to affect the braking output characteristics of the mechanically produced braking output. As a result, many existing braking systems lack the necessary versatility to accommodate the various situations that are encountered by the driver and that require different braking outputs.

Improvements in the mode of operation of hydraulic braking systems is, therefore, desired.

SUMMARY OF THE DISCLOSURE

The present disclosure generally relates to hydraulic braking systems. More particularly, the present disclosure is directed towards a hydraulic braking system having an electronically controlled full power brake valve. The hydraulic braking system of the present disclosure includes a primary brake valve assembly, a secondary valve assembly and an electronic controller. The system is designed such that the pressure output of the primary brake valve assembly can be varied based on inputs received from vehicle sensors, thereby, giving a wide range of control options.

In one aspect of the invention, the hydraulic braking system supplies a braking output for a vehicle having at least one wheel. The hydraulic braking system includes a primary valve assembly that is configured to receive a manually controlled input that varies the braking output of the braking system. The primary valve assembly includes a first spool valve configured to vary the braking output according to the manually controlled input. The hydraulic braking system also includes a secondary valve assembly integral with the primary valve assembly. The secondary valve assembly is configured to receive input signals from a programmable electronic controller and includes a second spool valve configured to operate with the primary valve assembly. The secondary valve assembly also includes an actuator for engaging and actuating the second spool valve according to the input signals received from the programmable electronic controller such that the second spool valve modulates the braking output produced by the primary valve assembly.

In one aspect of the invention, the first spool valve is positionable between a first position, a second position, and an intermediate position between the first and second positions. In the first position, the first spool valve provides fluid communication between at least one of the wheels and a first pressure source. In the second position, the first spool valve provides fluid communication between at least one of the wheels and a second pressure source. In the intermediate position, the first spool valve restricts fluid communication between the vehicle wheels and the first and second pressure sources. Similarly, the second spool valve is positionable between a first position, a second position, and an intermediate position between the first and second positions. In the second spool valve first position, the second spool valve provides fluid communication between the primary valve assembly and the first pressure source. In the second spool valve second position, the second spool valve provides fluid communication between the primary valve assembly and the second pressure source. In the second spool valve intermediate position, the second spool valve restricts fluid communication between the vehicle wheels and the first and second pressure sources. In so doing, the second spool valve is able to modulate between the secondary valve assembly first and intermediate positions such that the secondary valve assembly pilot assists the primary valve assembly to intensify the braking output provided by the primary valve assembly when the actuator urges the second spool valve to the first position.

In yet another aspect, the second spool valve is constructed and arranged to modulate between the secondary valve assembly second and intermediate positions such that the secondary valve assembly decreases the braking output produced by the primary valve assembly.

In still yet another aspect, the actuator is a solenoid actuator having a coil and an armature for engaging and actuating the second spool valve according to the input signals received from the programmable electronic controller. In so doing, the second spool valve modulates the braking output produced by the primary valve assembly.

Furthermore, the programmable electronic controller is configurable to receive input from one or more vehicle control systems such that the secondary valve assembly modulates the braking output produced by the primary valve assembly according to preset values. Alternatively, the programmable electronic controller is configurable to receive input from a serial control device such that the secondary valve assembly modulates the braking output produced by the primary valve assembly in real-time.

The above summary of the present invention is not intended to describe each illustrated embodiment or every implementation of the present invention. Other objects, features and advantages of the present invention will become more apparent in light of the following detailed description of exemplary embodiments thereof, as illustrated in the accompanying drawings.

BRIEF DESCRIPTION OF THE DRAWINGS

The invention may be more completely understood in consideration of the following detailed description of various embodiments of the invention in connection with the accompanying drawings, in which:

FIG. 3 is a cross-sectional view of a hydraulic brake system according to the principals of the present disclosure shown in an actuated state;

Figure 1:
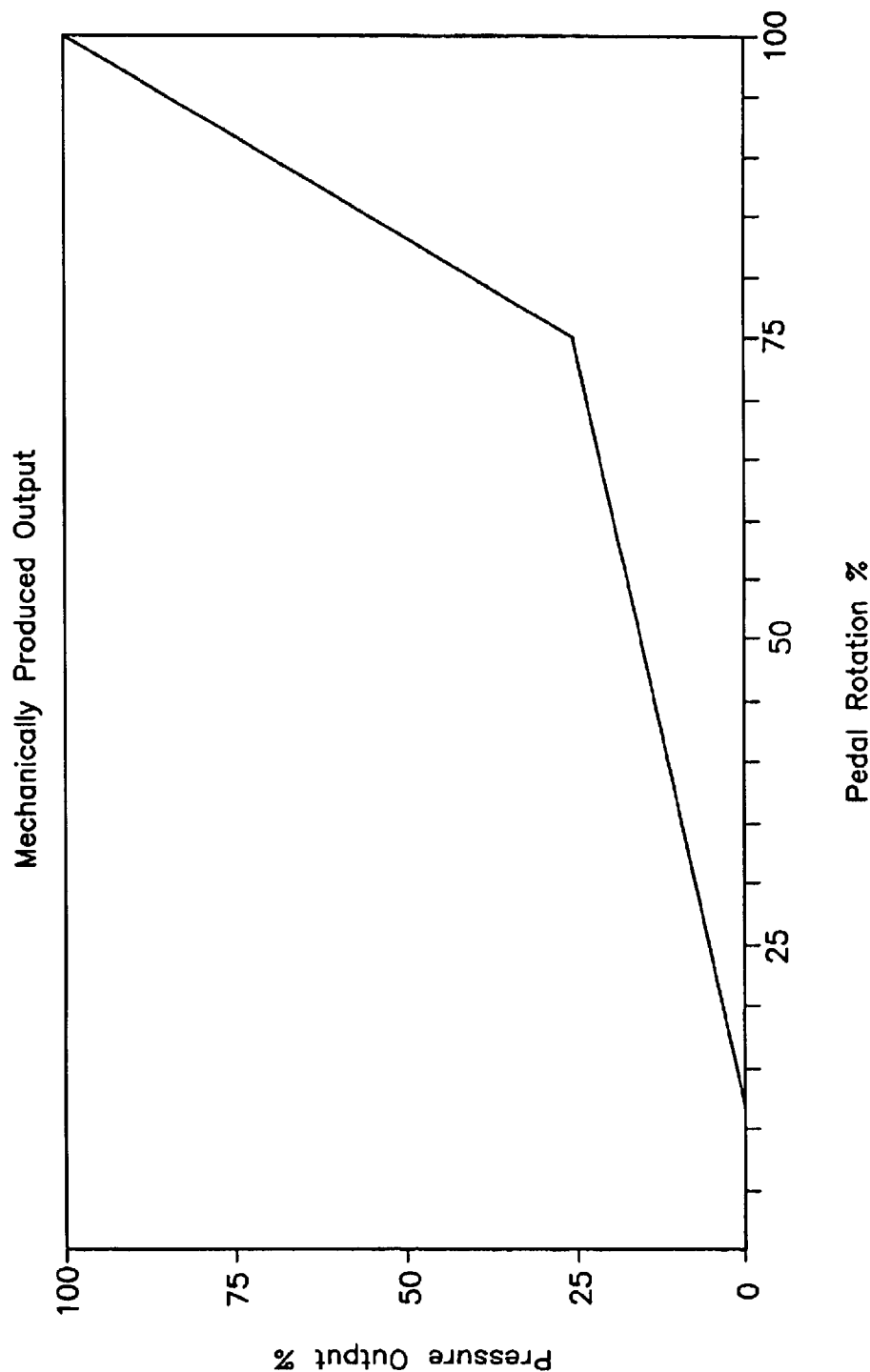
FIG. 1 is a view showing the mechanically produced output of a hydraulic braking system in accordance with the prior art represented as pressure output percentage versus pedal rotation percentage.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present disclosure generally relates to hydraulic braking systems. More particularly, the present disclosure is directed towards a hydraulic braking system having an electronically controlled full power brake valve. While the present invention is not so limited, a more detailed understanding of the present invention will be gained through a discussion of the drawings in connection with the examples provided below.

Figure 2:
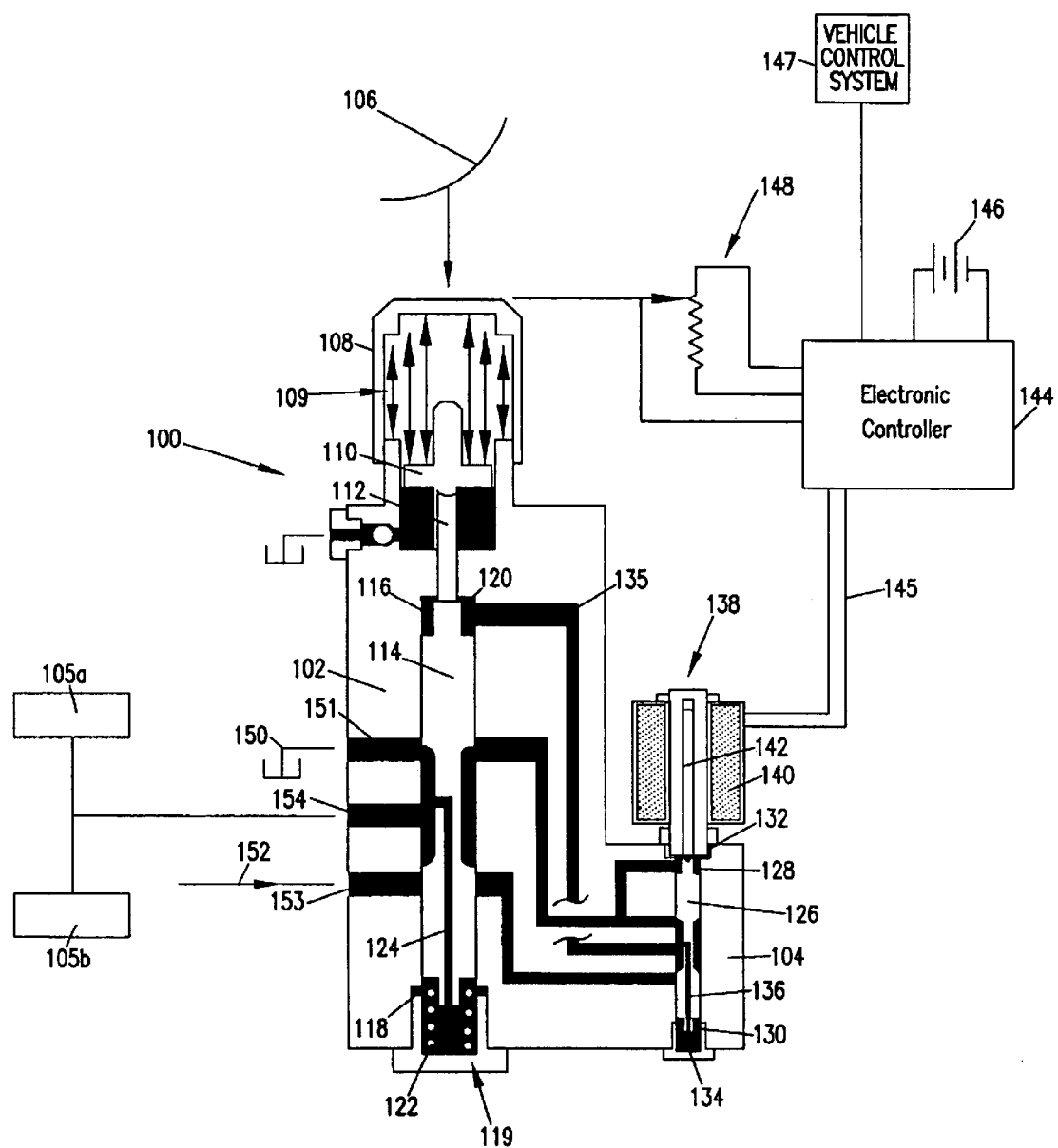
FIG. 2 is a cross-sectional view of a hydraulic brake system according to the principals of the present disclosure shown in a non-actuated state.

Referring now to FIG. 2, a cross-sectional view of a hydraulic brake valve 100 according to the principals of the present disclosure is shown in a non-actuated state. By "non-actuated," it is generally meant that the vehicle brakes are not engaged and, thus, do not restrict the motion of the vehicle. Conversely, the hydraulic braking system as shown in FIG. 3 depicts the hydraulic brake valve 100 in an actuated state. By "actuated," it is generally meant that the vehicle brakes are at least partially engaged and, thus, restrict the motion of the vehicle.

As shown in FIG. 2 the hydraulic brake valve 100 includes a primary brake valve assembly 102 and a secondary brake valve assembly 104. The primary brake valve assembly 102 is configured to receive a manually controlled input through an actuating mechanism 106, such as a brake pedal, brake lever, or other suitable mechanism for providing manually controlled input into the hydraulic braking system. The actuating mechanism 106 transmits an input force from the operator to the brake assembly through an input cylinder 108. As shown in FIG. 2, the actuating mechanism 106 acts on a spring 109 (represented as arrows) and moves a spring retainer 110 disposed within the input cylinder 108 downwardly through the housing of the primary valve 102. By "downwardly," it is generally meant that in the orientation of the braking system shown in FIG. 2, the spring retainer 110 moves from the top of the input cylinder 108 in the direction of the primary valve assembly 102.

The spring retainer 110 urges an intermediate piston 112 into engagement with a first spool valve 114 disposed within the primary valve assembly 102. The first spool valve 114 is a conventional spool valve as is generally known in the art. The first spool valve 114 is configured to selectively provide fluid communication between the vehicle brakes 105a, 105b and a first pressure source 150 or a second pressure source 152. In the arrangement as shown in FIG. 2, the first pressure source 150 can be a pressure drain or reservoir pressure. The second pressure source 152 can be a high pressure source or system pressure that is provided by a pump or accumulator (not shown). As discussed above, the braking system 100 as shown in FIG. 2 is in a non-actuated state. Thus, in the configuration shown, the spool valve 114 is positioned such that fluid communication is provided between the vehicle wheels 105a, 105b and the reservoir 150. The various positions of the hydraulic braking system will be described in greater detail below in conjunction with FIGS. 6–8.

Figure 4:
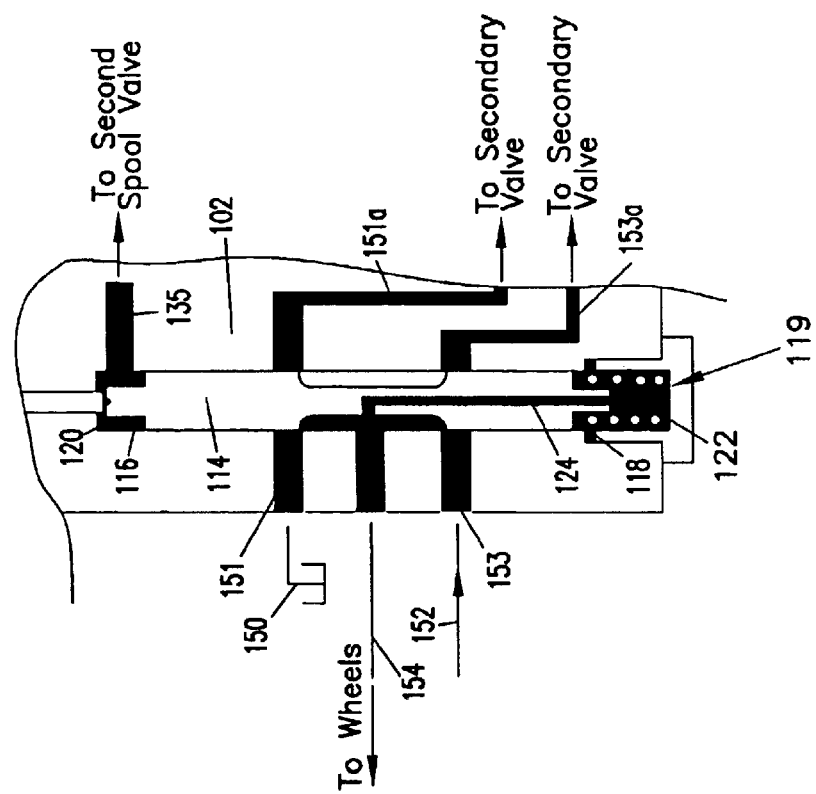
FIG. 4 is an enlarged, cross-sectional view of a primary valve assembly as illustrated in the hydraulic brake system of FIGS. 2 and 3.

Referring now to FIG. 4, an enlarged view of the primary valve assembly 102 is shown. The first spool valve 114 has a first end 116 and a second end 118 opposite the first end 116. As the spring retainer 110 (FIG. 2) is moved downwardly through the input cylinder 108 by the actuating mechanism 106 (FIG. 2), the spring retainer 110 urges the intermediate piston 112 into engagement with the first end 116 of the first spool valve 114.

As discussed above, the first spool valve 114 is configured to selectively provide fluid communication between the vehicle brakes 105a, 105b (FIG. 2) and a first pressure source 150 (e.g., the reservoir pressure) or a second pressure source 152 (e.g., the system pressure). For example, when the first spool valve 114 is in its non-actuated state, the first spool valve 114 is positioned such that fluid communication is provided between the vehicle brakes 105a, 105b and the reservoir 150 via passageway 154 and passageway 151. Alternatively, when the first spool valve 114 is in its actuated state, the first spool valve 114 is positioned such that fluid communication is provided between the vehicle brakes 105a, 105b and the system pressure 152 via passageway 153 and passageway 154. Accordingly, high pressure hydraulic fluid is supplied directly to the vehicle brakes 105a, 105b when the first spool valve is in an actuated state.

Referring again to FIG. 2, a secondary valve assembly 104 is operable with and integral with the primary valve assembly 102. By "integral," it is generally meant that the secondary valve assembly 104 and the primary valve assembly 102 are constructed and arranged such that they are integrated and formed as part of a single structure. The secondary valve assembly 104 includes a second spool valve 126 that is configured to operate with the primary valve assembly 102. The second spool valve 126 is a conventional spool valve as is generally known in the art. The second spool valve 126 is configured to selectively provide fluid communication between the first spool valve 114 and the first pressure source 150 (e.g., the reservoir pressure) or the second pressure source 152 (e.g., the system pressure). In an actuated state, the secondary valve assembly 104 provides fluid communication between the primary valve assembly 102 and the system pressure 152. Conversely, in a non-actuated state, the secondary valve assembly 104 provides fluid communication between the primary valve assembly 102 and the reservoir pressure 150.

The second valve assembly 104 also includes an actuator 138 for engaging and actuating the second spool valve 126 between a non-actuated state to an actuated state. In one embodiment, the actuator 138 is an electromagnetic solenoid. However, the actuator 138 can be any mechanism that is capable of actuating the second spool valve 126 between a non-actuated state and an actuated state. In the illustrated embodiment, the actuator 138 preferably has a coil 140 and a plunger or armature 142 disposed within the coil 140. As is generally understood, the coil 140 can be constructed and arranged to generate a magnetic field that is capable of driving the armature 142 downwardly in the axial direction of the coil 140. Again, by "downwardly," it is generally meant that in the orientation of the braking system shown in FIG. 2, the armature 142 moves from the top and along the axial direction of the coil 140 towards the second spool valve 126. The magnetic field created within the coil 140 urges the armature 142 into engagement with the second spool valve 126.

The actuator 138 receives input signals 145 from an electronic controller 144. The electronic controller is configured to vary the input signals 145 supplied to the actuator 138 according to input received from an interface circuit 148. In one embodiment, the interface circuit 148 can be any sensor capable of varying an electronic signal to the electronic controller 144 based upon the relative position of the actuating mechanism 106, such as a potentiometer or hall effect sensor. Accordingly, the electronic controller 144 is capable of varying the input signals 145 (e.g., electrical current) to the actuator 138 based upon the relative position of the actuating mechanism 106. In so doing, the electronic controller 144 can actuate the secondary valve assembly 104 such that the secondary valve assembly 104 pilot assists the primary valve assembly 102 during brake actuation. By "pilot assist," it is generally meant that the secondary valve assembly 104 increases the pressure applied to the primary valve assembly 102, thereby increasing the overall braking output for the braking system 100. Moreover, because the electronic controller 144 varies the input signals 145 based upon the relative position of the actuation mechanism 106, the secondary valve assembly 104 and the intermediate piston 112 (FIG. 2) are able to intensify the ratio of output pressure to input position of the pedal. A more detailed discussion of the electronic controller 144 is presented below.

Conversely, when the actuator 138 is not actuating the secondary valve assembly 104, the second spool valve 126 is in a non-actuated state. Thus, the second spool valve 126 is positioned such that secondary valve assembly 104 does not exert any fluid pressure on the primary valve assembly 102. To accomplish this, fluid communication is provided between the primary valve assembly 102 and the reservoir 150. The various positions of the hydraulic braking system will be described in greater detail below in conjunction with FIGS. 6–8.

Figure 5:
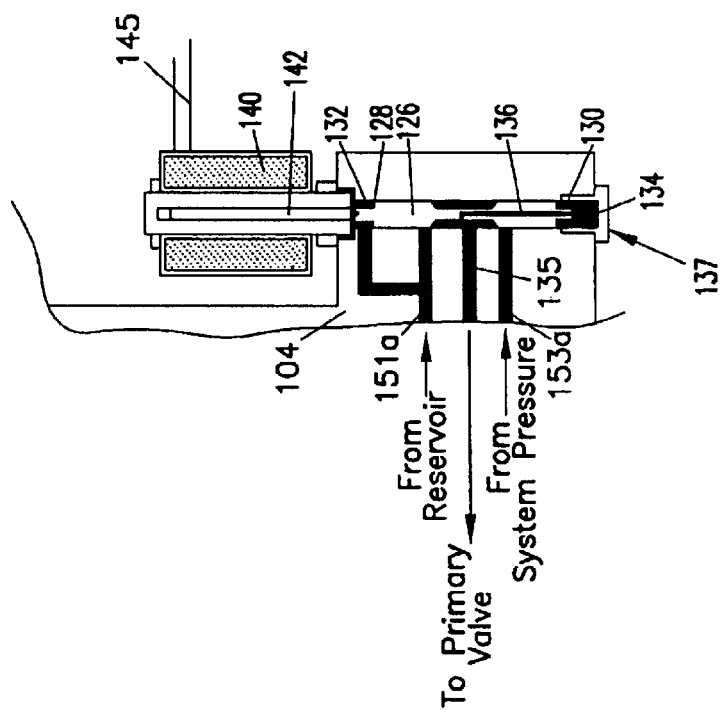
FIG. 5 is an enlarged, cross-sectional view of a secondary valve assembly as illustrated in the hydraulic brake system of FIGS. 2 and 3.

Referring now to FIG. 5, an enlarged view of the secondary valve assembly 104 is shown. The second spool valve 126 has a first end 128 and a second end 130 opposite the first end 128. The secondary valve assembly 104 can also include a spring 137 that biases the second spool valve 126 towards the non-actuated state. The second spool valve 126 as shown in FIG. 5 is shown in a partially actuated state. When the actuator coil 140 is energized, the armature 142 is biased or forced downwards and into engagement with the first end 128 of the second spool valve 126. Conversely, when the actuator coil is de-energized, the armature 142 returns to its natural, unbiased position within the coil 140, therefore, allowing the spring 137 to return the second spool valve 126 to the non-actuated state.

As discussed above, the second spool valve 126 is configured to selectively provide fluid communication between the primary valve assembly 102 and a first pressure source 150 (e.g., the reservoir pressure) or a second pressure source 152 (e.g., the system pressure). For example, when the second spool valve 126 is in its non-actuated state, the second spool valve 126 is positioned such that fluid communication is provided between the primary valve assembly 102 and the reservoir 150. More particularly, when the second spool valve 126 is in its non-actuated state, the second spool valve 126 is positioned such that fluid communication is provided between the first end 116 of the primary valve assembly 102 and the reservoir 150. Alternatively, when the second spool valve 126 is in its actuated state, the second spool valve 126 is positioned such that fluid communication is provided between the primary valve assembly 102 and the system pressure 152 via cavity 135. More particularly, when the second spool valve 126 is in its actuated state, the second spool valve 126 is positioned such that fluid communication is provided between the first end 116 of the primary valve assembly 102 and the system pressure 152. In the actuated state, the secondary valve assembly 104 pilot assists the primary valve assembly 102. Thus, the secondary valve assembly 104 increases the pressure applied to the first end 116 of the first spool valve 114 and, therefore, further biases the first spool valve 114 into its actuated state as described above.

Figure 6:
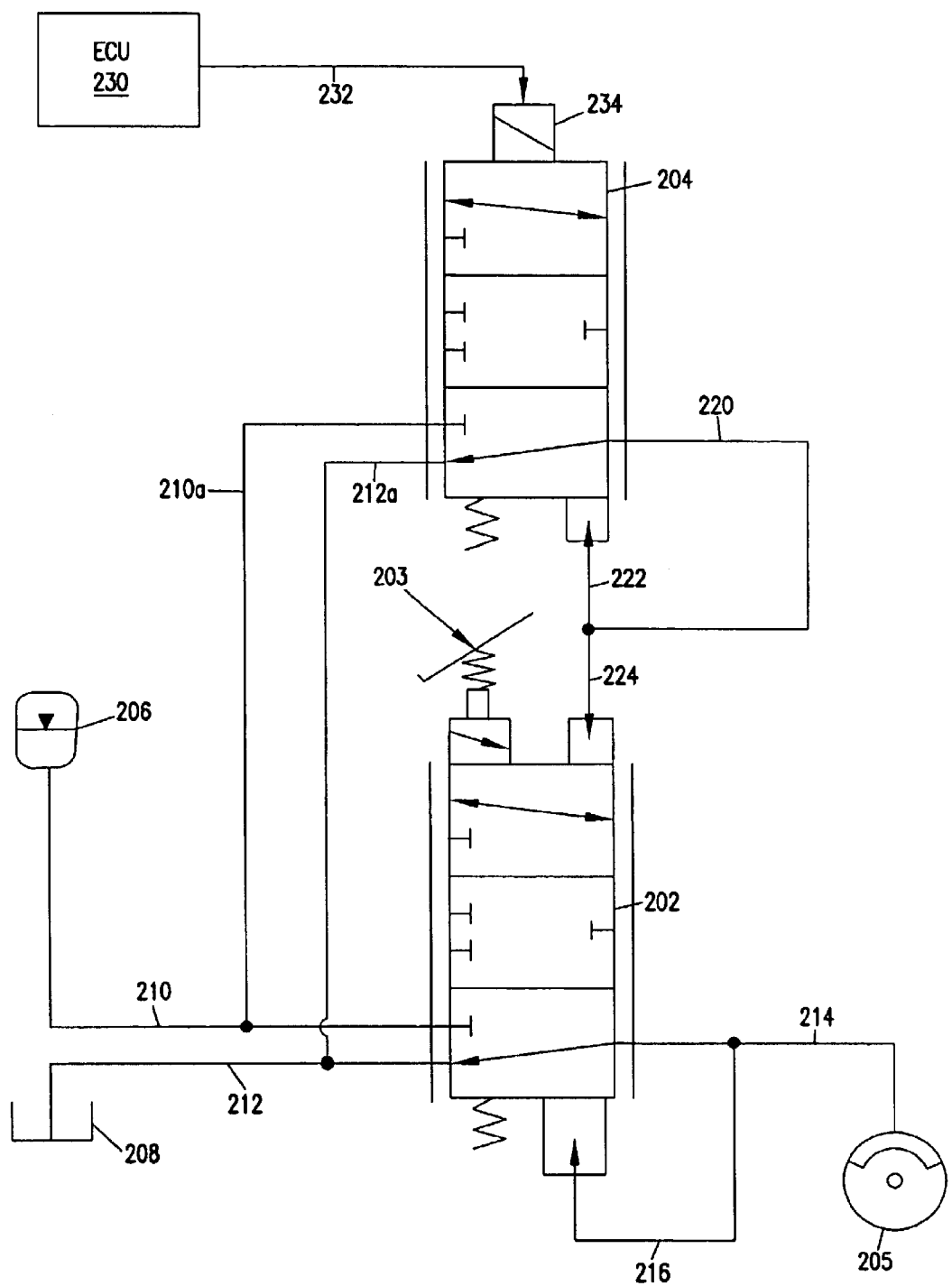
FIG. 6 is a hydraulic schematic diagram of the hydraulic brake system illustrated in FIGS. 1 and 2 shown in a first (non-actuated) position.
Figure 7:
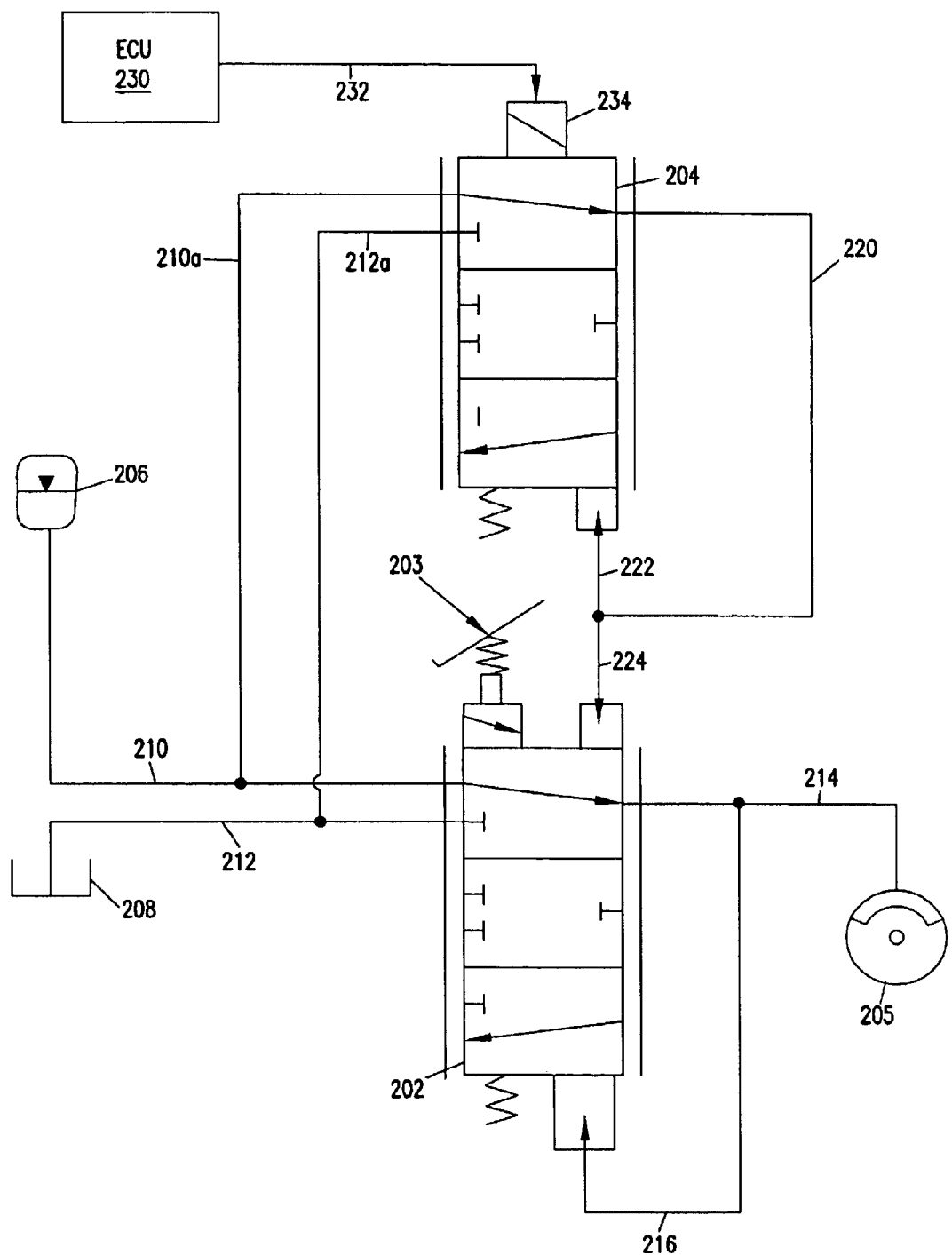
FIG. 7 is a hydraulic schematic diagram of the hydraulic brake system illustrated in FIGS. 1 and 2 shown in a second (actuated) position.
Figure 8:
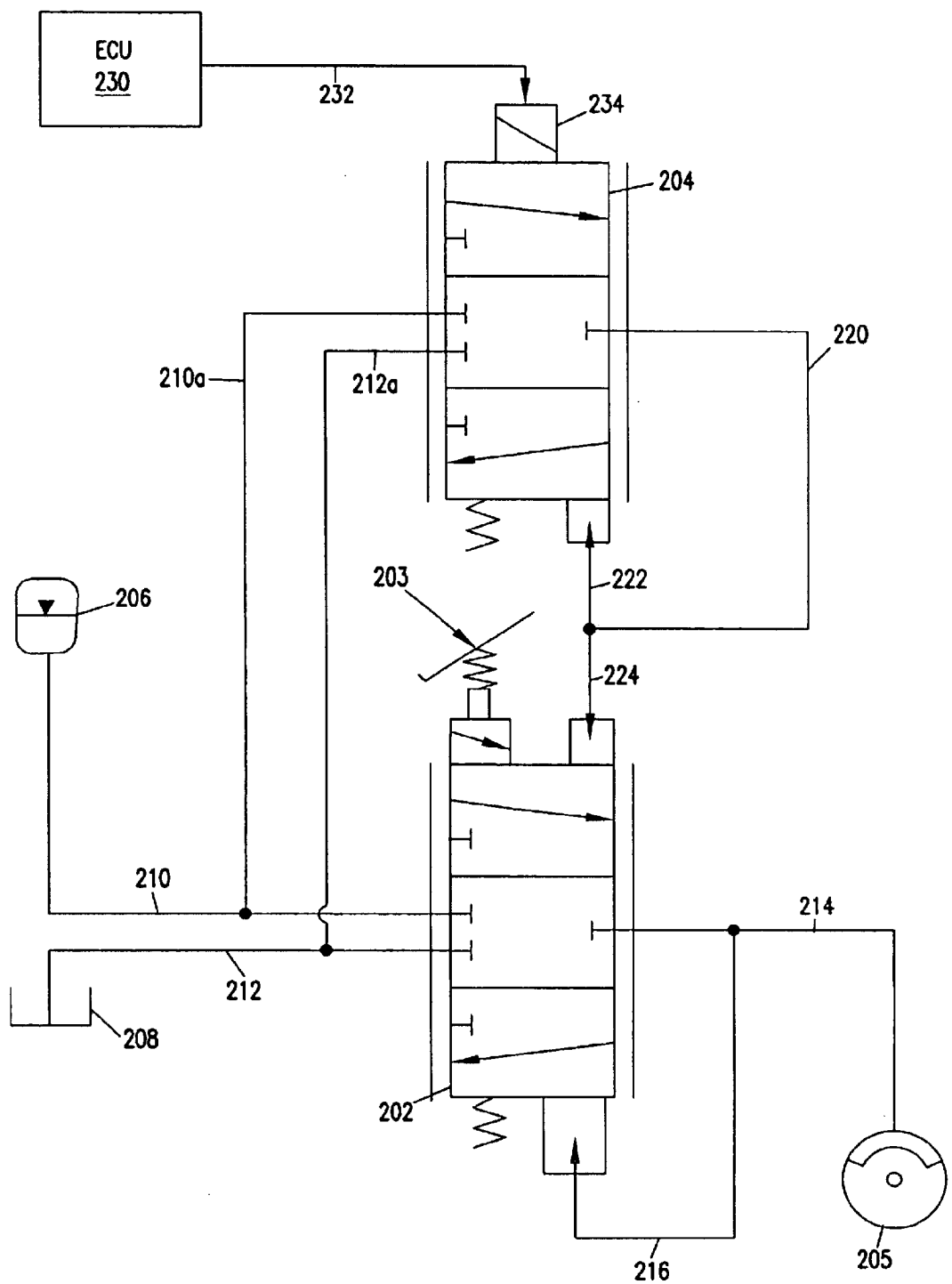
FIG. 8 is a hydraulic schematic diagram of the hydraulic brake system illustrated in FIGS. 1 and 2 shown in an intermediate position between the first and second positions of FIGS. 6 and 7.

FIGS. 6–8 are hydraulic schematic diagrams that illustrate the various positions of the first spool valve and second spool valves of the hydraulic braking system described above. The first spool valve 202 (e.g., first spool valve 102 described above) is positionable between a first position, a second position, and an intermediate position between the first and second position. Similarly, the second spool valve 204 (e.g., second spool valve 104 described above) is positionable between a corresponding a first position, second position, and intermediate position between the first and second position.

As shown in FIG. 6, the first spool valve 202 and the second spool valve 204 are each shown in the first position. In the first position, the first spool valve 202 is non-actuated and as such provides fluid communication between the reservoir pressure 208 to at least one of the vehicle brakes 205 via passageways 212, 214. Likewise, the second spool valve 204 is non-actuated in the first position and provides fluid communication between the reservoir pressure 208 and the primary valve assembly 202 via cavities 212a, 220 and 224.

FIG. 7 shows both the first spool valve 202 and the second spool valve 204 in the second position. As described above, the actuating mechanism 203 forces the primary valve assembly from the first position to the second position. In the second position, the primary valve assembly 202 provides fluid communication between the vehicle brakes 205 and the system pressure 206 through the system pressure passageways 210, 214.

While the first spool valve 202 is in the second position, the second spool valve 204 can be in any of its three positions depending upon the input signals 232 provided to the actuator 234 from the electronic controller 230. For example, the second spool valve 204 can remain in the first position such that fluid communication is provided between the reservoir pressure 208 and the first spool valve 202. This typically occurs when the hydraulic brake system of the present disclosure suffers a power failure. In such a scenario, the secondary valve assembly is unable to assist the primary valve assembly during braking. Instead, the primary valve assembly operates as it normally does. Accordingly, the hydraulic brake valve of the present disclosure simplifies the operational mechanics used to apply the brakes when the system suffers a power failure.

Alternatively, while the first spool valve 202 is in the second position, the second spool valve 204 can be urged towards its second position by the actuator 234 as depicted in FIG. 7. In its second position, the second spool valve 204 provides fluid communication between the first spool valve 202 and the system pressure 206 through the passageways 210a, 220 and 224.

FIG. 8 shows both the first spool valve 202 and the second spool valve 204 in the intermediate position. In the intermediate position, the first spool valve 202 restricts substantially all fluid communication between the vehicle brakes 205 and the reservoir pressure 208 and the system pressure 206. Similarly, the secondary valve assembly 204 restricts substantially all fluid communication between the primary valve assembly 202 and the reservoir pressure 208 and the system pressure 206. The intermediate positions of the first and second spool valves 202, 204 are typically achieved as the first and second spool valves 202, 204 modulate between their respective first and second positions. Modulation of the first and second spool valves 202, 204 will be discussed in greater detail below.

The operational mechanics of the hydraulic brake system of the present disclosure will now be described in connection with FIGS. 2–5. As is commonly understood by those skilled in the art, the first spool valve 114 is a conventional spool valve and is constructed and arranged to modulate between first and second positions. By "modulate," it is generally meant that the first spool valve 114 moves within the primary valve assembly 102 between the first position, intermediate, and second positions according to the pressures or forces being exerted on its first end 116 and its second end 118. Furthermore, the modulation in the first spool valve 114 allows the reactive force on the actuating mechanism 106 (FIG. 2) felt by the operator to be proportional to the brake line pressure being generated in passageway 154.

For example, when a user depresses the actuating mechanism 106, the spring retainer 110 within the input cylinder 108 (FIG. 2) urges the intermediate piston 112 into engagement with the first end 116 of the first spool valve 114. As discussed above, the intermediate piston 112 urges the spool valve downwards to provide fluid communication between the system pressure 152 and the vehicle brakes 105a, 105b via passageway 154. In this position, high pressure fluid is also provided to a second chamber 122 via feedback circuit 124. Accordingly, the high pressure fluid in the second chamber 122 urges the first spool valve 114 upwards and acts against the downwardly acting force provided by the intermediate piston 112 on the first end 116 of the first spool valve 114. In situations where the force provided by the intermediate piston 112 is less than the force provided by the high pressure fluid in the second chamber 122, the high pressure fluid in the second chamber 122 biases the first spool valve 114 upwards towards its first position. Conversely, in situations where the force provided by the intermediate piston 112 is greater than the force provided by the high pressure fluid in the second chamber 122, the intermediate piston 112 is able to bias the first spool valve 114 downwards towards its second position.

As discussed above, the electronic controller 144 sends input signals 145 to the actuator 138. The electronic controller 140 is capable of varying the input signals 145 (e.g., the electrical current) supplied to the actuator 138 based upon the relative position of the actuating mechanism 106. Therefore, the electronic controller 140 is capable of actuating the secondary valve assembly 104 such that the secondary valve assembly 104 pilot assists the primary valve assembly 102 during brake actuation. In other words, when the electronic controller 140 actuates the secondary valve assembly 104, the secondary valve assembly 104 increases the pressure applied to the primary valve assembly 102 by applying hydraulic pressure directly to the first spool valve 114, for example, the first end 116 of the first spool valve.

The second spool valve 126 operates in a similar fashion to the first spool valve 114 as discussed above. For example, as can be seen in FIG. 3, when the actuator 138 is energized, the armature 142 urges the second spool valve 126 downward into an actuated state. In the actuated state, the second spool valve 126 provides fluid communication between the system pressure 152 via passageway 153a and the primary valve assembly 102 via passageway 135. More specifically, the second spool valve 126 provides fluid communication between the first end 116 of the first spool valve 114 and the system pressure 152.

The high pressure fluid acting on the first end 116 of the first spool valve 114 via the passageway 135 increases the downwardly acting forces on the first spool valve 114 and further biases the first spool valve 114 towards an actuated state. Thus, the secondary valve assembly 104 pilot assists the primary valve assembly 102 to intensify the braking output. Moreover, this causes the first spool valve 114 to continue to modulate between the actuated state and the intermediate position until the operator no longer desires braking and releases the pressure exerted on the actuating mechanism 106. As discussed above, because the braking output of the hydraulic braking system 100 (FIG. 2) is varied based upon the relative position of the actuation mechanism 106, the secondary valve assembly 104 serves to intensify the ratio of output braking pressure to input position of the actuating member 106.

Furthermore, the high pressure fluid in the fluid chamber 120 adjacent to the first end 116 of the first spool valve 114 exerts an upward pressure on the intermediate piston 112. This pressure exerted on the intermediate piston 112 is in turn felt by the operator via the actuating mechanism 106. As a result, the reactive force in the actuating mechanism 106 will be proportional to the brake line pressure being generated.

Referring again to the secondary valve assembly as shown in FIGS. 3 and 5, the second spool valve 126 has a feedback circuit 136 that allows high pressure fluid to enter a fluid chamber 134 adjacent to the second end 130 of the second spool valve 126. The pressure in the fluid chamber 134 acts on the second end 130 of the second spool valve 126. In so doing, the high pressure fluid opposes the force exerted on the first end 128 of the second spool valve 126 by the armature 142 such that the second spool valve 126 is biased upwards towards the intermediate position. Once in the intermediate position, if the force acting on the first end 128 of the second spool valve 126 by the armature 142 is sufficient to overcome the fluid pressure in the fluid chamber 134 and the force from return spring 137, the second spool valve 126 is again biased to an actuated state. Accordingly, the second spool valve 126 modulates between the actuated state and the intermediate position. As a result, the actuation of the secondary valve assembly 104 will increase the overall braking output of the braking system if the pressure being modulated from the secondary spool valve 104 creates a force on the first end 116 of the first spool valve 114 greater than the force being exerted on intermediate piston 112 from the actuating mechanism 106 through spring 109 and spring retainer 110. Furthermore, because the electronic controller 144 varies the input signals 145 based upon the relative position of the actuation mechanism 106, the secondary valve assembly 104 is able to intensify the ratio of output pressure to input force on the actuating mechanism 106 (e.g., the pedal).

Alternatively, the secondary valve assembly 104 can reduce the pressure being exerted on the first surface 116 of the first spool valve 114, thereby reducing the overall braking output of the braking system. For example, when the actuator 138 is de-energized, the pressure in the second chamber 134 and the return spring 137 is sufficient to overcome the force exerted on the first surface 128 of the second spool valve 126 such that the second spool valve 126 returns to the non-actuated position. As discussed above, the second spool valve 126 in its non-actuated state allows fluid communication between the first surface 116 of the first spool valve 114 and the reservoir 150. Accordingly, the fluid pressure in the first chamber 120 is decreased, thereby allowing the first spool valve 114 to be urged towards its non-actuated state. As a result, the overall braking output of the braking system is reduced.

The electronic controller 144 is programmable. By "programmable," it is generally meant that the electronic controller 144 is capable of receiving input from one or more sensors or vehicle control systems to vary the braking output from the hydraulic braking system 100. In one embodiment, the electronic controller 144 can be actively programmed in real-time using, for example, a serial controller or other similar controller. Alternatively, the electronic controller 144 can be automatically set to permanent or temporary preset values according to digital inputs from one or more vehicle control systems 147. For example, the vehicle control systems 147 can be the anti-lock brake system, the collision avoidance system, or other vehicle control systems. In either case, the electronic controller 144 is capable of supplying an appropriate braking output based upon both the road conditions and/or the operator's driving or braking requirements.

Figure 9:
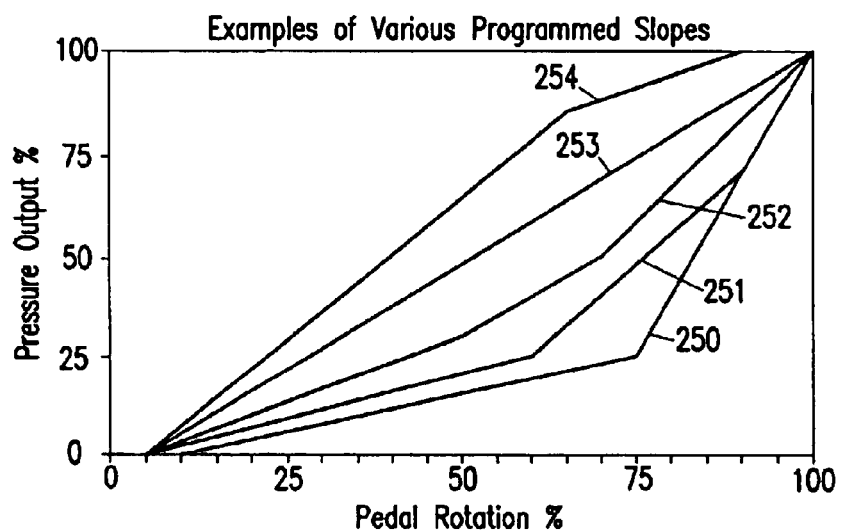
FIG. 9 is a view showing various braking outputs produced using an electronic controller according to the present disclosure varied relative to pedal position.

FIG. 9 illustrates various braking output slopes produced as a result of the electronic controller 144. Line 250 shows the mechanically produced braking output of a standard brake valve without electronic control according to the principles of the present disclosure. The electronic controller 144 can be used to produce different braking profiles according to the relative position of the actuating mechanism 106 (e.g., the brake pedal). For example, the electronic controller 144 can be programmed to produce a linear braking output as shown by line 253. Furthermore, additional examples of how the electronic controller 144 can be used to create braking profiles are shown by lines 252, 253 and 254.

It will be understood that a wide variety of specific configurations and applications are feasible, using the techniques disclosed herein. The operation of the hydraulic brake system of the present disclosure will now be described in connection with various particular embodiments.

EXAMPLE ONE

In one embodiment, the ratio of braking output to manual input can be continuously adjusted according to various vehicle conditions, such as vehicle speed, vehicle payload or operator preference. Accordingly, the hydraulic braking system of the present disclosure can be used to vary the brake pressure in a variety of ways that improve the operation of the vehicle on which it is used. Alternatively, the braking system can provide additional stopping pressure when necessary based on commands from a vehicle system controller or wheel speed sensors.

Figure 10:
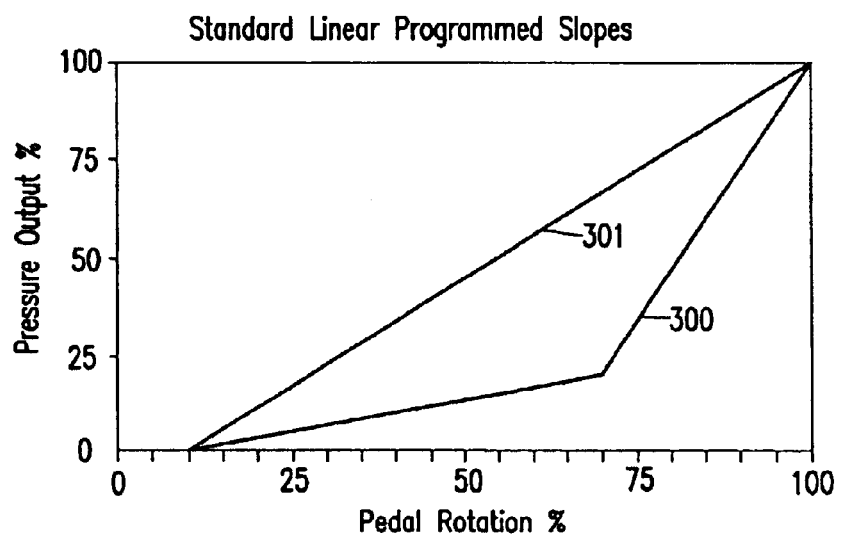
FIG. 10 is a view showing a standard linear programmed slope represented as pressure output percentage versus pedal rotation percentage.
Figure 11:
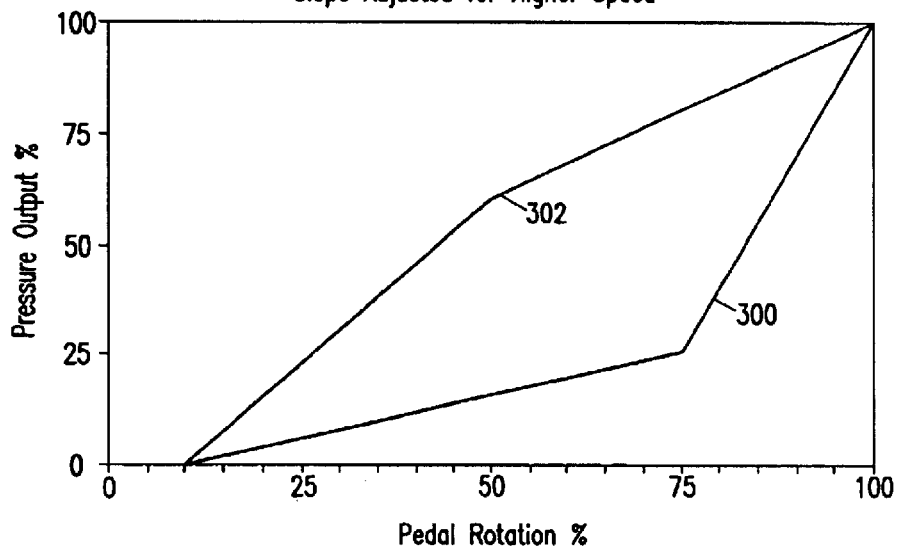
FIG. 11 is a view showing a slope adjusted for lower speeds represented as pressure output percentage versus pedal rotation percentage.
Figure 12:
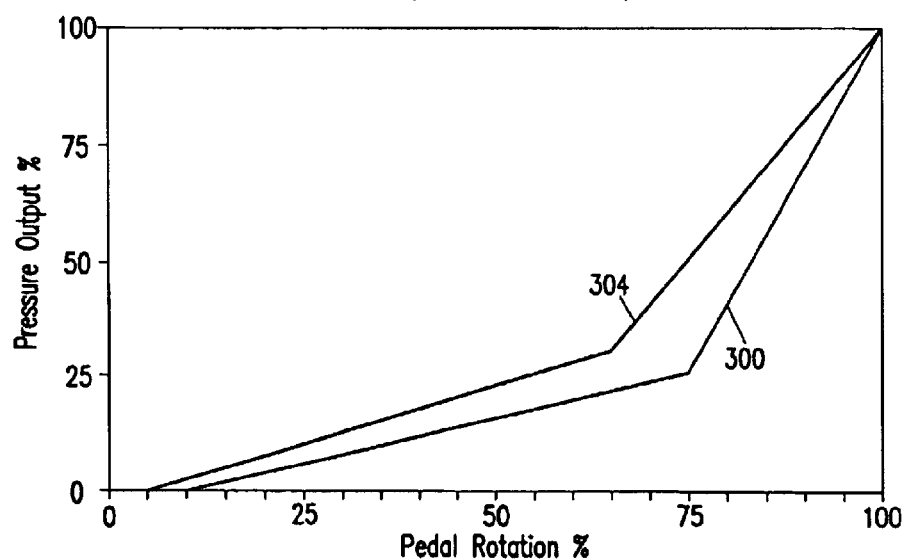
FIG. 12 is a view showing a slope adjusted for higher speeds represented as pressure output percentage versus pedal rotation percentage.

FIG. 10 shows a view of the ratio of output braking pressure percentage to pedal rotation percentage. Line 300 shows a standard slope (e.g., mechanically produced braking output) of a brake valve without electronic control according to the principles of the present disclosure. Line 301 shows the braking output where the hydraulic brake valve produces a fully linear output from 0 percent pedal rotation through 100 percent pedal rotation using the electronic controller as described above. Alternatively, FIGS. 11 and 12 illustrate braking outputs that have been adjusted by the electronic controller in response to specific vehicle conditions, for example, vehicle speed. For example, FIG. 11 shows the braking output (e.g., line 302) adjusted for higher speeds. In this view, the electronically controlled brake valve of the present disclosure allows more accurate braking at high speeds. Similarly, FIG. 12 shows the braking output (e.g., line 304) adjusted for lower speeds. In this view, the electronically controlled brake valve allows more accurate braking at lower speeds.

The control system can be made to give operators the brake "feel" that they desire. For example, the system can be programmed to give more aggressive braking, as shown in FIG. 11 (e.g., line 302) or it can be programmed to give less aggressive, or "spongier," brake feel as shown in FIG. 12 (e.g., line 304). Different slopes can be stored in the controller or a input can come from the system controller or additional inputs (e.g. a potentiometer or discrete electrical inputs) into the programmable electronic controller.

EXAMPLE TWO

Figure 13:
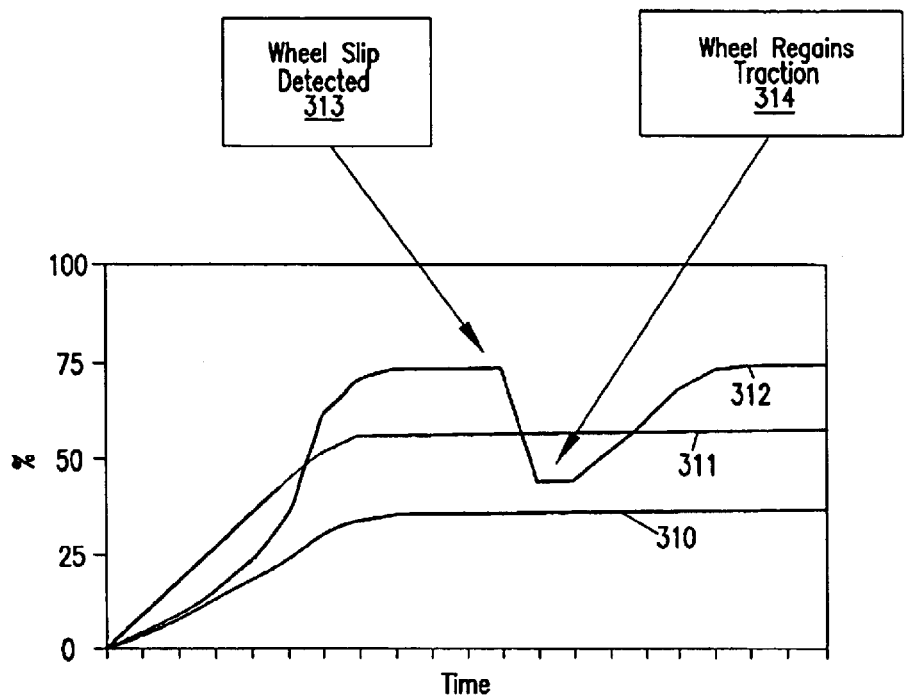
FIG. 13 is a view showing exemplary programmed slopes according to an embodiment of the present disclosure.

FIG. 13 illustrates the braking output of the electronically controlled hydraulic brake valve of the present disclosure being programmed to provide output according to digital input from the vehicle antilock braking system. Line 310 illustrates the mechanical output of the brakes system provided without electrical enhancement from the electronic controller. Line 311 illustrates the rotation percentage of the brake pedal. Line 312 illustrates the actual electronically enhanced braking output provided by the brake valve of the present disclosure. As the brakes are applied, the wheel slippage is detected 313. Accordingly, the electronic controller sends signals to the brake valve to decrease the braking force to the vehicle wheels. Once the wheels regain traction 314, the electronic control sends input signals to the brake valve to increase the braking output, thereby further decelerating the vehicle.

EXAMPLE THREE

Figure 14:
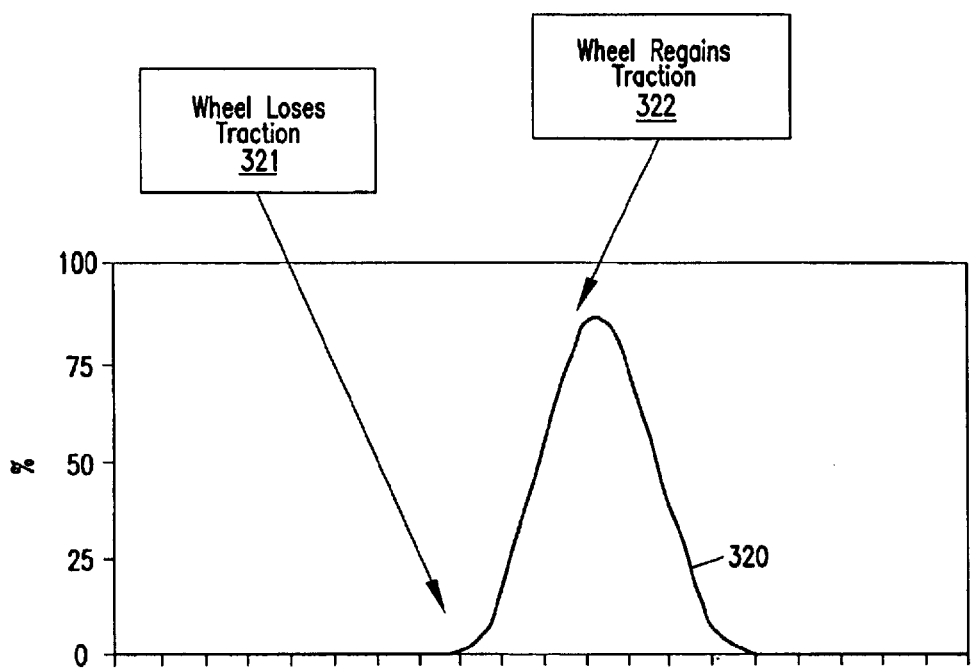
FIG. 14 is a view showing another exemplary programmed braking slope according to an embodiment of the present disclosure.

FIG. 14 illustrates the braking output of the electronically controlled hydraulic brake valve of the present disclosure being programmed to provide output according to digital input from a traction control system. Line 320 illustrates the actual electronically enhanced braking output provided by the brake valve of the present disclosure. As wheel traction lose is detected 321 the electronic controller sends signals to the brake valve to increase the braking force to the slipping wheels. Once the wheels regain traction 322, the electronic control sends input signals to the brake valve to decrease the braking output.

The above specification and embodiments are believed to provide a complete description of the manufacturer and use of particular embodiments of the invention. Many embodiments of the invention can be made without departing from the spirit and scope of the invention, which is limited by the attached claims.

I claim:

1. A hydraulic braking system for supplying a braking output to a vehicle having at least one wheel, the braking system comprising:
   (a) a primary valve assembly configured to receive a manually controlled input that varies the braking output, the primary valve assembly including:
      (i) a first spool valve configured to vary the braking output according to the manually controlled input; and
   (b) a secondary valve assembly integral with the primary valve assembly, the secondary valve assembly being configured to receive input signals from a programmable electronic controller, the secondary valve assembly including:
      (i) a second spool valve configured to operate with the primary valve assembly; and
      (ii) an actuator for engaging and actuating the second spool valve according to the input signals received from the programmable electronic controller such that the second spool valve assists the braking output produced by the primary valve assembly;
   (c) wherein the braking output of the system includes a first braking output and a second assisted braking output, and wherein the system is configured to provide each of the first braking output and the second assisted braking output at the same manually controlled input.

2. The hydraulic braking system of claim 1, wherein:
   (a) the actuator is a solenoid actuator having a coil and an armature for engaging and actuating the second spool valve according to the input signals received from the programmable electronic controller such that the second spool valve modulates the braking output produced by the primary valve assembly.

3. The hydraulic braking system of claim 1, wherein:
   (a) the programmable electronic controller is configured to receive input from one or more vehicle control systems such that the secondary valve assembly modulates the braking output produced by the primary valve assembly according to preset values.

4. The hydraulic braking system of claim 3, wherein:
   (a) the vehicle control system is an anti-lock brake system.

5. The hydraulic braking system of claim 3, wherein:
   (a) the vehicle control system is a traction control brake system.

6. The hydraulic braking system of claim 1, wherein:
   (a) the programmable electronic controller is configured to receive input from a serial control device such that the secondary valve assembly modulates the braking output produced by the primary valve assembly in real-time.

7. The hydraulic braking system of claim 1, wherein:
   (a) the programmable electronic controller is configured to receive input from one or more electronic sensors such that the secondary valve assembly modulates the braking output produced by the primary valve assembly in real-time.

8. The hydraulic braking system of claim 1, furthering including:
   (a) a brake valve body including at least a first fluid chamber and a second fluid chamber, wherein the first spool valve of the primary valve partially defines the first fluid chamber, and the second spool valve of the secondary valve assembly partially defines the second fluid chamber.

9. An electronically enhanced brake valve for a vehicle having at least one wheel, the brake valve comprising:
   (a) a primary valve assembly including a primary valve housing, the primary valve housing defining a primary pressure chamber and a housing outport for communicating a braking output, the primary valve assembly being configured to receive a manually controlled input that varies the braking output, the primary valve assembly including:
      (i) a first spool valve configured to vary the braking output according to the manually controlled input; and
   (b) a secondary valve assembly configured to receive input signals from a programmable electronic controller, the secondary valve assembly including:
      (i) a second spool valve configured to operate with the primary valve assembly; and
      (ii) an actuator configured to engage and actuate the second spool valve according to the input signals received from the programmable electronic controller such that the second spool valve increases the braking output, the increased braking output being provided within the primary pressure chamber and communicated through the housing outport of the primary valve assembly;

(c) wherein the braking output of the system includes a first braking output and a second braking output, and wherein the system is configured to provide each of the first braking output and the second braking output at the same manually controlled input.

10. The brake valve of claim 9, wherein:
(a) the actuator configured to engage and actuate the second spool valve to increase the braking output produced by the primary valve assembly is also configured to engage and actuate the second spool valve according to the input signals received from the programmable electronic controller such that the second spool valve decreases the braking output produced by the primary valve assembly.

11. The brake valve of claim 10, wherein:
(a) the programmable electronic controller is configured to receive input from one or more electronic sensors such that the secondary valve assembly modulates the braking output produced by the primary valve assembly according to preset values.

12. The brake valve of claim 10, wherein:
(a) the programmable electronic controller is configured to receive input from one or more vehicle control systems such that the secondary valve assembly modulates the braking output produced by the primary valve assembly according to preset values.

13. The brake valve of claim 12, wherein:
(a) the vehicle control system is an anti-lock brake system.

14. The brake valve of claim 12, wherein:
(a) the vehicle control system is a traction control brake system.

15. The brake valve of claim 10, wherein:
(a) the programmable electronic controller is configured to receive input from a serial control device such that the secondary valve assembly modulates the braking output produced by the primary valve assembly in real-time.

16. The brake valve of claim 10, wherein:
(a) the programmable electronic controller is configured to receive input from one or more electronic sensors such that the secondary valve assembly modulates the braking output produced by the primary valve assembly in real-time.

17. The brake valve of claim 9, wherein:
(a) the secondary valve assembly is integral with the primary valve assembly.

18. The brake valve of claim 9, wherein:
(a) the actuator includes a solenoid actuator having a coil and an armature for engaging and actuating the second spool valve to increase the braking output produced by the primary valve assembly.

19. A hydraulic braking system for supplying a braking output to a vehicle having at least one wheel, the braking system comprising:
(a) a primary valve assembly configured to receive a manually controlled input that varies the braking output, the primary valve assembly including:
(i) a first spool valve configured to vary the braking output according to the manually controlled input, the first spool valve being positionable between a first position, a second position, and intermediate positions between the first and second positions;
(1) the first position providing fluid communication between at least one of the wheels and a first pressure source;
(2) the second position providing fluid communication between at least one of the wheels and a second pressure source; and
(3) the intermediate positions restricting fluid communication between the vehicle wheels and the first and second pressure sources; and
(b) a secondary valve assembly integral with the primary valve assembly, the secondary valve assembly being configured to receive input signals from a programmable electronic controller, the secondary valve assembly including:
(i) a second spool valve configured to operate with the primary valve assembly, the second spool valve being positionable between a first position, a second position, and intermediate positions between the first and second positions;
(1) the first position providing fluid communication between the primary valve assembly and the first pressure source;
(2) the second position providing fluid communication between the primary valve assembly and the second pressure source; and
(3) the intermediate position restricting fluid communication between the vehicle wheels and the first and second pressure sources; and
(ii) an actuator for engaging and actuating the second spool valve according to the input signals received from the programmable electronic controller such that the second spool valve modulates between the secondary valve assembly first and intermediate positions such that the secondary valve assembly pilot assists the primary valve assembly to intensify the braking output provided by the primary valve assembly when the actuator urges the second spool valve to the second position.

20. The hydraulic braking system of claim 19, wherein:
(a) the second spool valve further being constructed and arranged to modulate between the secondary valve assembly second and intermediate positions such that the secondary valve assembly decreases the braking output produced by the primary valve assembly.

21. An electronically enhanced brake valve for controlling a braking output to a vehicle having at least one wheel, the brake valve comprising:
(a) a primary valve assembly configured to receive a manually controlled input that varies the braking output, the primary valve assembly including:
(i) a first spool valve configured to vary the braking output according to the manually controlled input, the first spool valve being positionable between a first position, a second position, and an intermediate position between the first and second positions;
(1) the first position providing fluid communication between at least one of the wheels and a first pressure source;
(2) the second position providing fluid communication between at least one of the wheels and a second pressure source; and
(3) the intermediate position restricting fluid communication between the vehicle wheels and the first and second pressure sources; and
(b) a secondary valve assembly integral with the primary valve assembly, the secondary valve assembly being configured to receive input signals from a programmable electronic controller, the secondary valve assembly including:
(i) a second spool valve configured to operate with the primary valve assembly, the second spool valve is positionable between a first position, a second position, and an intermediate position between the first and second positions;
   (1) the first position providing fluid communication between the primary valve assembly and the first pressure source;
   (2) the second position providing fluid communication between the primary valve assembly and the second pressure source; and
   (3) the intermediate position restricting fluid communication between the vehicle wheels and the first and second pressure sources; and
(ii) a solenoid actuator having a coil and an armature for engaging and actuating the second spool valve according to the input signals received from the programmable electronic controller such that the second spool valve modulates between the secondary valve assembly first and intermediate positions such that the secondary valve assembly pilot assists the primary valve assembly to intensify the braking output provided by the primary valve assembly when the armature urges the second spool valve to the second position.

22. The brake valve of claim 21, wherein:
(a) the second spool valve further being constructed and arranged to modulate between the secondary valve assembly second and intermediate positions such that the secondary valve assembly decreases the braking output produced by the primary valve assembly.

23. The brake valve of claim 21, wherein:
(a) the first pressure source is system pressure; and
(b) the second pressure source is ambient pressure.

24. A braking system for providing a range of braking outputs, the braking system comprising:
(a) a pedal rotatable in a range of operating positions, the range including at least a first operating position;
(b) a primary valve assembly operating upon rotation of the pedal, the primary valve assembly having a fluid pressure chamber and a spring arrangement, the spring arrangement being arranged to compress when the pedal is rotated and transmit a force from the fluid pressure chamber to the pedal when the fluid pressure chamber is pressurized, the primary valve assembly providing:
   (i) a first braking output and a first pedal feedback force, the first pedal feedback force corresponding to compression of the spring arrangement by the pedal when the pedal is positioned in the first operating position; and
(c) a secondary valve assembly in fluid communication with the fluid pressure chamber of the primary valve assembly, the secondary valve assembly being configured to operate with the primary valve assembly to assist the braking output of the braking system, the secondary valve assembly operating upon a signal from an electronic controller to pressurize the fluid pressure chamber of the primary valve assembly, the secondary valve assembly providing:
   (i) a second braking output and a second pedal feedback force, the second pedal feedback force corresponding to:
   1) compression of the spring arrangement of the primary valve by the pedal when the pedal is in the first operating position; and
   2) force derived from the pressurized fluid pressure chamber of the primary valve assembly provided when the electronic controller signals the secondary valve to operate.

25. The braking system of claim 24, wherein:
(a) the spring arrangement is positioned adjacent to a piston, the piston partially defining the fluid pressure chamber, the spring arrangement being configured to provide the force derived from the pressurized fluid pressure chamber by movement of the piston and compression of the portion of the spring arrangement when the fluid pressure chamber is pressurized.

26. The braking system of claim 24, wherein:
(a) the fluid pressure chamber of the primary valve assembly is pressurized to provide the first braking output independent of operation of the secondary valve assembly.

27. The braking system of claim 24, wherein:
(a) the primary valve assembly is configured to provide the first braking output without operation of the secondary valve assembly.

28. A braking system comprising:
(a) an actuator mechanism configured to provide a manual control input, the manual control input including a range of input values;
(b) a primary valve assembly interconnected to the actuator mechanism, the primary valve assembly being configured to operate upon receipt of the manual control input;
(c) a secondary valve assembly arranged in fluid communication with the primary valve assembly, the secondary valve assembly being configured to operate upon receipt of an electronic input from a controller;
(d) wherein the braking system provides:
   (i) a first braking output and a corresponding first force that acts upon the actuation mechanism when the manual control input is operated at a first input value of the range of input values; and
   (ii) a second braking output and a corresponding second force that acts upon the actuation mechanism while the manual control input is operated at the first input value of the range of input values.

29. The braking system of claim 28, wherein:
(a) the first braking output and corresponding first force are provided when only the primary valve is operated.

30. The braking system of claim 28, wherein:
(a) the second braking output and corresponding second force are provided when the secondary valve assists the braking output provided by the primary valve.

31. The braking system of claim 28, wherein:
(a) the manual control input corresponds to a position of an actuator mechanism.

32. The braking system of claim 31, wherein:
(a) the manual control input corresponds to a rotational position of a pedal-operated actuator mechanism.

33. The braking system of claim 28, wherein:
(a) the primary valve assembly operates upon receipt of the manual control input without operation of the secondary valve assembly.

34. A braking system providing a braking output, the braking system comprising:
(a) a pedal positionable in a range of operating positions;
(b) a primary valve assembly interconnected to the pedal, the primary valve assembly being configured to provide a pedal feedback force when the pedal is positioned at a first operating position of the range of operating positions;

(c) a secondary valve configured to operate with the primary valve assembly;

(d) wherein the system defines an operating ratio of pedal feedback force to operating position, the secondary valve being configured to increase the operating ratio while the pedal remains in the first operating position.

35. The braking system of claim 34, wherein:

(a) operation of only the primary valve assembly provides an initial operating ratio, and operation of the secondary valve in conjunction with the primary valve assembly increases the operating ratio from the initial operating ratio to a second operating ratio.

36. The braking system of claim 34, wherein:

(a) the operating ratio corresponds to the braking output of the system such that increasing the operating ratio of the system while the pedal remains in the first operating position also increases the braking output of the system.

37. The braking system of claim 34, wherein:

(a) the primary valve assembly is configured to provide a braking output without operation of the secondary valve.

* * * * *